United States Patent
Su et al.

(10) Patent No.: US 10,123,019 B2
(45) Date of Patent: Nov. 6, 2018

(54) PIECEWISE INTER-LAYER PREDICTION FOR SIGNALS WITH ENHANCED DYNAMIC RANGE

(71) Applicants: Dolby International AB, Amsterdam (NL); DOLBY LABORATORIES LICENSING CORPORATION, San Francisco, CA (US)

(72) Inventors: Guan-Ming Su, Fremont, CA (US); Qian Chen, San Jose, CA (US); Peng Yin, Ithaca, NY (US); Ralf Willenbacher, Berlin (DE)

(73) Assignees: Dolby Laboratories Licensing Corporation, San Francisco, CA (US); Dolby International AB, Amsterdam Zuidoost (NL)

( * ) Notice: Subject to any disclaimer, the term of this patent is extended or adjusted under 35 U.S.C. 154(b) by 135 days.

(21) Appl. No.: 15/118,064

(22) PCT Filed: Feb. 4, 2015

(86) PCT No.: PCT/US2015/014482
§ 371 (c)(1),
(2) Date: Aug. 10, 2016

(87) PCT Pub. No.: WO2015/123067
PCT Pub. Date: Aug. 20, 2015

(65) Prior Publication Data
US 2017/0180734 A1  Jun. 22, 2017

Related U.S. Application Data

(60) Provisional application No. 62/013,611, filed on Jun. 18, 2014, provisional application No. 61/939,614, filed on Feb. 13, 2014.

(51) Int. Cl.
*H04N 7/12* (2006.01)
*H03M 13/00* (2006.01)
(Continued)

(52) U.S. Cl.
CPC ......... *H04N 19/139* (2014.11); *H04N 19/105* (2014.11); *H04N 19/182* (2014.11);
(Continued)

(58) Field of Classification Search
CPC .... H04N 19/52; H04N 19/105; H04N 19/139; H04N 19/182; H04N 19/521
See application file for complete search history.

(56) References Cited

U.S. PATENT DOCUMENTS 9,264,681 B2  2/2016 Gish
9,843,800 B2 * 12/2017 Marpe .................... H04N 19/36
(Continued)

FOREIGN PATENT DOCUMENTS

CN  101513069  8/2009
JP  2012-520619  9/2012
(Continued)

OTHER PUBLICATIONS

Dunham, J.G. "Optimum Uniform Piecewise Linear Approximation of Planar Curves" IEEE Transaction on Pattern Analysis and Machine Intelligence, vol. PAMI-8, No. 1, Jan. 1986, pp. 67-75.
(Continued)

*Primary Examiner* — Tsion B Owens

(57) ABSTRACT

Pixel data of a video sequence with enhanced dynamic range (EDR) are predicted based on pixel data of a corresponding video sequence with standard dynamic range (SDR) and a piecewise inter-layer predictor. The output parameters of the piecewise predictor are computed based atleast on two sets of pre-computed values and a prediction cost criterion. The first set of pre-computed values applies to all input SDR
(Continued)

frames and comprises a set of SDR pixel values raised to one or more integer power terms. The second set of pre-computed values is frame specific and is computed based on a histogram of an input SDR frame and pixel values of the corresponding EDR frame. The pre-computed values allow for a fast iterative algorithm to identify the best pivot points for the piecewise polynomials according to a prediction cost and to solve for the coefficients of the piecewise predictor.

20 Claims, 3 Drawing Sheets

(51) Int. Cl.
*H04N 19/139* (2014.01)
*H04N 19/30* (2014.01)
*H04N 19/105* (2014.01)
*H04N 19/182* (2014.01)
*H04N 19/52* (2014.01)
*H04N 19/513* (2014.01)

(52) U.S. Cl.
CPC ............. *H04N 19/30* (2014.11); *H04N 19/52* (2014.11); *H04N 19/521* (2014.11)

(56) References Cited

U.S. PATENT DOCUMENTS 9,948,916 B2 * 4/2018 Li .................... H04N 13/0048
2010/0020866 A1 * 1/2010 Marpe .............. H04N 19/00569
  375/240.02
2011/0090959 A1 4/2011 Wiegand
2013/0177066 A1 7/2013 Ye
2015/0103902 A1 * 4/2015 Li .......................... H04N 19/30
  375/240.12
2015/0341675 A1 11/2015 Su

FOREIGN PATENT DOCUMENTS

| WO | 2008/043198 | 4/2008 |
| WO | 2012/142471 | 10/2012 |
| WO | 2012/148883 | 11/2012 |
| WO | 2013/103522 | 7/2013 |
| WO | 2013/112532 | 8/2013 |

OTHER PUBLICATIONS

Mai, Z. et al "Optimizing a Tone Curve for Backward-Compatible High Dynamic Range Image and Video Compression" IEEE Transactions on Image Processing, vol. 20, No. 6, Jun. 2011, pp. 1558-1571.

Moreno, C. "A Wrapper for Look-up Tables (LUT) Operations in C++" Internet Citation, Apr. 10, 2001, pp. 1-7; retrieved from URL:http:/fweb.archive.orgjweb/20010410174243/http://www.mochima.com/articles/LUT/LUT.html [retrieved on Oct. 8, 2009].

Lauga, P. et al "Segmentation-Based Optimized Tone Mapping for High Dynamic Range Image and Video Coding" IEEE Picture Coding Symposium, Dec. 8, 2013, pp. 257-260.

* cited by examiner

PIECEWISE INTER-LAYER PREDICTION FOR SIGNALS WITH ENHANCED DYNAMIC RANGE

CROSS REFERENCE TO RELATED APPLICATIONS

The present application may be related to PCT Application with Ser. No. PCT/US2013/073085, filed on Dec. 4, 2013, which is incorporated herein by reference in its entirety. The present application claims the benefit of priority from U.S. Provisional Patent Application Ser. No. 61/939,614, filed on Feb. 13, 2014, and U.S. Provisional Application Ser. No. 62/013,611, filed on Jun. 18, 2014, each of which is each hereby incorporated by reference in its entirety.

TECHNOLOGY

The present invention relates generally to images. More particularly, an embodiment of the present invention relates to piecewise inter-layer prediction for encoding and decoding signals with enhanced dynamic range.

BACKGROUND

Audio and video compression is a key component in the development, storage, distribution, and consumption of multimedia content. The choice of a compression method involves tradeoffs among coding efficiency, coding complexity, and delay. As the ratio of processing power over computing cost increases, it allows for the development of more complex compression techniques that allow for more efficient compression. As an example, in video compression, the Motion Pictures Expert Group (MPEG) from the International Standards Organization (ISO) has continued improving upon the original MPEG-1 video standard by releasing the MPEG-2, MPEG-4 (part 2), H.264/AVC (or MPEG-4, part 10), and the H.265/HEVC coding standards.

Video signals may be characterized by multiple parameters, such as bit-depth, color space, color gamut, and resolution. Modern televisions and video playback devices (e.g., Blu-ray players) support a variety of resolutions, including standard-definition (e.g., 720x480i) and high-definition (HD) (e.g., 1920x1080p). Ultra high-definition (UHD) is a next generation resolution format with at least a 3,840x2,160 resolution (referred to as 4K UHD) and options to go as high as 7680x 4320 (referred to as 8K UHD). Ultra high-definition may also be referred to as Ultra HD, UHDTV, or super high-vision. As used herein, UHD denotes any resolution higher than HD resolution.

Another aspect of a video signal's characteristic is it dynamic range. Dynamic range (DR) is a range of intensity (e.g., luminance, luma) in an image, e.g., from darkest darks to brightest brights. As used herein, the term 'dynamic range' (DR) may relate to a capability of the human psychovisual system (HVS) to perceive a range of intensity (e.g., luminance, luma) in an image, e.g., from darkest darks to brightest brights. In this sense, DR relates to a 'scene-referred' intensity. DR may also relate to the ability of a display device to adequately or approximately render an intensity range of a particular breadth. In this sense, DR relates to a 'display-referred' intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 orders of magnitude of the human visual system (HVS). For example, well adapted humans with essentially normal vision (e.g., in one or more of a statistical, biometric or ophthalmological sense) have an intensity range that spans about 15 orders of magnitude. Adapted humans may perceive dim light sources of as few as a mere handful of photons. Yet, these same humans may perceive the near painfully brilliant intensity of the noonday sun in desert, sea or snow (or even glance into the sun, however briefly to prevent damage). This span though is available to 'adapted' humans, e.g., those whose HVS has a time period in which to reset and adjust.

In contrast, the DR over which a human may simultaneously perceive an extensive breadth in intensity range may be somewhat truncated, in relation to HDR. As used herein, the terms 'enhanced or extended dynamic range' (EDR), 'visual dynamic range,' or 'variable dynamic range' (VDR) may individually or interchangeably relate to the DR that is simultaneously perceivable by a HVS. As used herein, EDR may relate to a DR that spans 5-6 orders of magnitude. Thus while perhaps somewhat narrower in relation to true scene referred HDR, EDR nonetheless represents a wide DR breadth. As used herein, the term 'simultaneous dynamic range' may relate to EDR.

In practice, images comprise one or more color components (e.g., luma Y and chroma Cb and Cr) wherein each color component is represented by a precision of n-bits per pixel (e.g., n=8). Using linear luminance coding, images where n≤8 (e.g., color 24-bit JPEG images) are considered images of standard dynamic range, while images where n>8 may be considered images of enhanced dynamic range. EDR and HDR images may also be stored and distributed using low bit-depth, non-linear luminance coding (e.g., 10-bits and logarithmic luminance coding), or high-precision (e.g., 16-bit) floating-point formats, such as the OpenEXR file format developed by Industrial Light and Magic.

To support backwards compatibility with legacy playback devices as well as new HDR or UHD display technologies, multiple layers may be used to deliver UHD and HDR (or EDR) video data from an upstream device to downstream devices. Given such a multi-layer stream, legacy decoders may use the base layer to reconstruct an HD SDR version of the content. Advanced decoders may use both the base layer and the enhancement layers to reconstruct an UHD EDR version of the content to render it on more capable displays. As appreciated by the inventors here, improved techniques for the layered coding of EDR video, especially at they relate to inter-layer prediction, are desirable.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which.

DESCRIPTION OF EXAMPLE EMBODIMENTS

Figure 1:
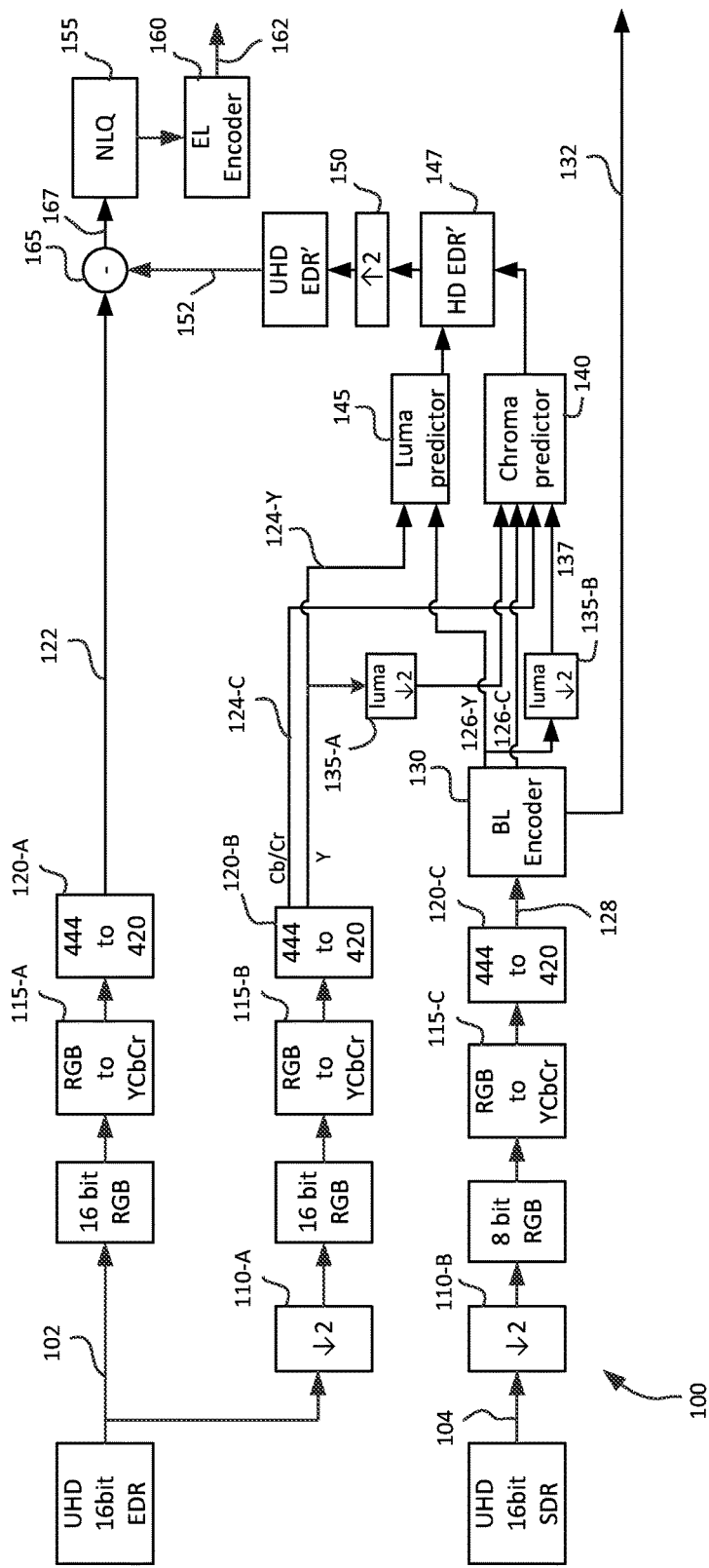
FIG. 1 depicts an example implementation of a layered EDR coding system with an inter-layer predictor according to an embodiment of this invention.

Inter-layer prediction as it applies to the layered coding of signals with enhanced dynamic range is described herein. Given an EDR input video signal that may coded using a base layer (BL) SDR signal and a residual EDR enhancement layer (EL), a fast piecewise inter-layer predictor between the two layers is constructed using pre-computed look-up tables based at least on histograms of the SDR BL signal and statistics of the corresponding EDR signal.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily obscuring the present invention.

Overview

Example embodiments described herein relate to piecewise inter-layer prediction in layered coding and decoding of video signals with enhanced dynamic range.

Pixel data of a video sequence with enhanced dynamic range (EDR) are predicted using a piecewise inter-layer predictor based on pixel data of a corresponding input video sequence with standard dynamic range (SDR). The parameters of the piecewise predictor are computed based at least on pre-computed look-up tables (LUTs) and a prediction cost criterion. A first LUT applies to all input SDR frames of fixed bit depth in a video sequence and comprises pre-computed values of a set of possible SDR pixel values raised to one or more integer power terms. A second LUT may be frame or scene specific and comprises pre-computed values based on a histogram of an input SDR frame and pixel values of the corresponding EDR frame. The pre-computed LUTs allow for a fast iterative algorithm to identify the best pivot points for the piecewise polynomials according to a prediction cost metric, and to solve for the coefficients of the associated piecewise polynomials.

In an embodiment, the piecewise predictor uses second order polynomials and the prediction cost criterion is based on the mean square error between the estimated EDR pixel values and the input EDR pixel values.

In an embodiment, the second LUT for a current frame is computed by taking into consideration pixel characteristics of both the current SDR and EDR frames and prior SDR and EDR frames to the current frame.

In an embodiment, the segments between the second pivot point and the second to last pivot point are all of the same length and each segment is approximated using either a first order or a second order polynomial.

Layered Encoding of EDR Signals

Existing display and play-back devices, such as HDTVs, set-top boxes, or Blu-ray players, typically support signals of up to 1080p HD resolution (e.g., 1920x 1080 at 60 frames per second). For consumer applications, such signals are now typically compressed using a bit-depth of 8 bits per pixel per color component in a luma-chroma color format where typically the chroma components have a lower resolution than then luma component (e.g., the YCbCr or YUV 4:2:0 color format). Because of the 8-bit depth and the corresponding low dynamic range, such signals are typically referred to as signals with standard dynamic range (SDR).

As new television standards are being developed, such as Ultra High Definition (UHD), it may be desirable to encode signals with enhanced resolution and/or enhanced dynamic range in a format that both legacy HDTV decoders and newer UHD decoders can process.

As described in PCT Application with Ser. No. PCT/US2013/073085, "Backward compatible coding for ultra-high definition signals with enhanced dynamic range," by G-M Su et al., filed on Dec. 4, 2013, which is incorporated herein by reference in its entirety, FIG. 1 depicts an embodiment of an example implementation of a system supporting backward-compatible coding of UHD signals with enhanced dynamic range (EDR). The encoder comprises a base layer (BL) Encoder (130) and an enhancement layer (EL) encoder (160). In an embodiment, BL Encoder (130) is a legacy encoder, such as an MPEG-2 or H.264 encoder, and EL Encoder (160) is a new standard encoder, such as an HEVC encoder. To support legacy BL decoders, BL encoder (130) is typically an 8-bit encoder; however, EL encoder (160) may support input streams with a higher bit depth, such as 10 bits, as specified by the H.264 and HEVC (H.265) standards. However, this system is applicable to coding EDR and SDR layers at any spatial resolution using any combination of either known or future encoders, whether they are standard-based or proprietary.

As depicted in FIG. 1, an input signal, such as a movie or television broadcast, may be represented by two signals: an UHD EDR input (102) and an UHD SDR input (104). For example, the UHD EDR signal (102) may be a 4K (e.g., 3840x2160) resolution signal captured by an HDR camera and color-graded for an EDR display. The same signal may also be color-graded on a 4K SDR display to generate a corresponding 4K SDR signal (104). Alternatively, the SDR signal (104) may be generated by applying to the EDR signal any of known in the art tone-mapping or display management techniques. Without loss of generality, both of these input signals may be typically represented in the RGB color-space using 16-bit or equivalent (e.g., floating point) bit-depth representations. As used herein, the term n-bit signal denotes an image or video signal with one or more color components (e.g., RGB or YCbCr), wherein each pixel in any one of these color components (e.g., Y) is represented by an n-bit pixel value. Given an n-bit representation, each such pixel may take values between 0 and $2^n-1$. For example, in an 8-bit representation, for each color component, each pixel can take values between 0 and 255.

In an embodiment, UHD SDR signal (104) may be down-sampled into an HD SDR signal (e.g., 1080p), which is then color converted to a color format suitable for encoding using a legacy 8-bit encoder, e.g., in 8-bit YCbCr 4:2:0 color format. Such a conversion may comprise color transformations (such as RGB to YCbCr conversion 115-C) and chroma sub-sampling (e.g., 4:4:4 to 4:2:0 conversion 120-C). Thus, HD SDR signal (128) represents a backward-compatible signal representation of the original UHD EDR signal (102). Signal (128) may be encoded by BL encoder (130) to generate a backward-compatible coded bitstream (132). BL encoder (130) may compress or encode HD SDR signal (128) using any of the known or future video compression algorithms, such as MPEG-2, MPEG-4, part 2, H.264, HEVC, VP8, VP9, and the like.

Given UHD EDR signal (102), down-sampling (110-A) and color conversion processes (115-B and 120-B) may convert UHD EDR signal (102) into a reference prediction HD EDR signal (124). In a preferred embodiment, the down-sampling and color conversion processes (110-A, 115-B, and 120-B) (e.g., selected filters and color space) in this stage should be identical or as close as possible to the down-sampling and color conversion processes (110-B, 115-C, and 120-C) used to generate the HD SDR signal (128) in the base layer.

Following the UHD EDR to HD EDR transformation, the output of HD EDR signal (124) is separated into luma (Y 124-Y) and chroma (CbCr 124-C) components, which are applied to determine the prediction coefficients for luma predictor (145) and chroma predictor (140).

Given HD SDR signal (128), BL Encoder (130) generates not only coded BL bitstream (132) but also BL signal (126) which represents HD SDR signal (128) as it will be decoded by a corresponding BL Decoder. In some embodiments, signal (126) may be generated by a separate BL decoder (not shown) following BL encoder (130). In some other embodiments, signal (126) may be generated from the feedback loop used to perform motion compensation in BL encoder (130). As depicted in FIG. 1, the output of HD EDR signal (126) may also be separated into its luma (Y 126-Y) and chroma components (CbCr 126-C) which are applied to Luma predictor (145) and Chroma predictor (140) to predict HD EDR's signal (147). In some other embodiments, down-sampling (110-A, 110-B) may be skipped, so all processing is performed at full resolution.

In an embodiment, Luma predictor (145) may comprise a polynomial predictor to predict luma components of HD EDR' signal (147) based on the luma pixel values of base layer HD SDR signal (126-Y). In such a predictor, a luma pixel component may be predicted without taking into consideration any pixel values in any of the other color components of the signal. For example, let $s_i$ denote the luma pixel values of BL HD SDR signal (126-Y), then, without loss of generality, a third-order polynomial predictor may be expressed as $$\hat{v}_i = \sum_{k=0}^{3} a_k s_i^k, \qquad (1)$$

where $a_k$, k=0 to 3, are the predictor coefficients. In an embodiment, the predictor coefficients may be determined by any known in the art minimization-error techniques, such as minimizing the mean-square-error (e.g., $\|v_i - \hat{v}_i\|^2$) between the predicted value ($\hat{v}_i$) and the luma pixel values in the reference HD EDR signal (124-Y) ($v_i$).

In an embodiment, chroma predictor (140) may also be a polynomial predictor, similar to the one described earlier; however, in a preferred embodiment, chroma predictor (140) comprises a multi-color channel, multiple regression (MMR), predictor, as the ones described by G-M Su et al., in PCT application Ser. No. PCT/US2012/033605 (published as WO2012/142471), "Multiple color channel multiple regression predictor," filed on Apr. 13, 2012, which is incorporated herein by reference in its entirety. An MMR predictor predicts the chroma components of the HD EDR's signal using information from both the luma and the chroma pixel values in the HD EDR reference signal (124) and the base layer HD SDR signal (126). The prediction coefficients in the MMR model may also be determined using mean-square-error minimization techniques by minimizing the MSE between the predicted chroma values and luma and chroma pixel values of the reference HD EDR signal (124).

Because both HD SDR signal (126) and reference HD HDR signal (124) are in a YCbCr 4:2:0 format, where the spatial resolution of the luma component is double the spatial resolution of each of the chroma components, the luma components of both of these signals are down-sampled (135-A and 135-B) before being applied to the chroma predictor (140). In a preferred embodiment, the filters used in luma down-sampling (135-A) and (135-B) are the same as the chroma down-sampling filters used in the 4:4:4 to 4:2:0 processing (120). Luma and Chroma prediction coefficients may be updated at a variety of time intervals of interest, such as per scene, per group of pictures, or per frame. Prediction filter coefficients may be communicated to a video decoder by a variety of methods, such as embedding their values in the bitstream as auxiliary data or metadata.

Given predicted HD EDR' signal (147), up-sampler (150) generates an UHD EDR' signal (152), which is used to generate the residual signal (167). Because UHD EDR's signal is in the preferred coding format (e.g., YCbCr 4:2:0), additional color transformation (115-A) and chroma down-sampling (120-A) steps may be needed to convert the original UHD EDR signal (102) from the original format (e.g., RGB) to UHD EDR signal (122) in the preferred coding format. Signals (122) and (152) are subtracted to create the EL residual signal (167).

In an embodiment, color transformation (115-A) and chroma sub-sampling processes (120-A) are identical or as close as possible to the color transformation (115-B and 115-C) and chroma sub-sampling processes (120-B and 120-C) being used to generate the BL-coded signal (128) and the prediction signal (124).

In an embodiment, before coding EL signal (167) by EL encoder (160), the signal may be processed by a non-linear quantizer (NLQ) (155). Examples of suitable non-linear quantizers may be found in PCT patent Application Ser. No. PCT/US2012/034747 (published as WO2012/148883), "Non-Linear VDR Residual Quantizer," filed on Apr. 24, 2012, which is incorporated herein by reference in its entirety. The output of the NLQ (155) may be compressed using an EL encoder (160) to generate a coded EL bitstream (162) which may be transmitted to suitable decoders. Furthermore, in some embodiments, residual (167) may also be spatially down-sampled by a down-sampling module (not shown). Such down-sampling (e.g., by a factor of two or four in both dimensions) improves coding efficiency, especially at very low bit rates. Down-sampling may be performed either before or after the non-linear quantizer (155).

EL encoder (160) may be any suitable encoder, such as those described by the MPEG-2, MPEG-4, H.264, HEVC specifications and the like. In an embodiment, BL coded bitstream (132), EL coded bitstream (162), and metadata related to the coding process (e.g., the predictor parameters or look-up tables) may be multiplexed into a single bit stream (not shown).

In some embodiments, the base line HD SDR signal (128) may already be available to encoder (100) in the correct resolution and color format. In such a case, the down-sampling (110-B) and color transformations steps (115-C and 120-C) may be bypassed.

In some embodiments, the UHD EDR signal (102) may be available in lower or higher precision than 16-bit; however, its precision is expected to be higher than 8 bits (e.g., 10 bits or 12 bits). Similarly, UHD SDR signal (104) may already be available in a precision lower than 16 bits (e.g., 8 bits or 10 bits).

Piecewise Inter-Layer Prediction
Background and Nomenclature

Let $s_{ji}$ denote the i-th pixel at frame j of an SDR signal (e.g., 126-Y). Let $v_{ji}$ denote the corresponding co-located pixel in EDR signal (e.g., 124-Y). Let $\hat{v}_{ji}$ denote the corresponding co-located predicted EDR pixel (e.g., 147). Suppose there are P pixels in the given picture. Given, without limitation, a 2nd order polynomial predictor, then for the i-th pixel, the predicted value can be expressed as $$\hat{v}_{ji} = m_{j0} + m_{j1} \cdot s_{ji} + m_{j2} \cdot (s_{ji})^2, \quad (2)$$

where $m_{ji}$, for i=0, 1, and 2, denote the prediction coefficients.

In an embodiment, the prediction coefficients may be determined to minimize a distortion metric using a prediction cost function, such as the mean square error (MSE) between the original and the predicted EDR pixel values (e.g., $\|v_i - \hat{v}_i\|^2$). Equation (2) may be expressed in a matrix/vector form, such as $$\begin{bmatrix} \hat{v}_{j0} \\ \hat{v}_{j1} \\ \hat{v}_{j2} \\ \vdots \\ \hat{v}_{j,P-1} \end{bmatrix} = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix} \begin{bmatrix} m_{j0} \\ m_{j1} \\ m_{j2} \end{bmatrix}, \quad (3)$$

or $\hat{v}_j = S_j m_j$, where $$\hat{v}_j = \begin{bmatrix} \hat{v}_{j0} \\ \hat{v}_{j1} \\ \hat{v}_{j2} \\ \vdots \\ \hat{v}_{j,P-1} \end{bmatrix}, S_j = \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,P-1} & s_{j,P-1}^2 \end{bmatrix}, \text{ and } m_j = \begin{bmatrix} m_{j0} \\ m_{j1} \\ m_{j2} \end{bmatrix}.$$

Then, a least squares solution may be obtained as $$m_j = ((S_j)^T(S_j))^{-1}((S_j)^T v_j), \quad (4)$$

where $$v_j = \begin{bmatrix} v_{j0} \\ v_{j1} \\ v_{j2} \\ \vdots \\ v_{j,P-1} \end{bmatrix}$$

denotes the reference EDR pixel values (124). Let $B_j$ and $a_j$ be defined as:

$$B_j = (S_j)^T(S_j) \quad (5)$$

and $$a_j = (S_j)^T v_j. \quad (6)$$

Then, from equation (4)

$$m_j = B_j^{-1} a_j. \quad (7)$$

In an embodiment, the performance of a predictor (e.g., 145) could be improved using piecewise polynomial prediction. In such an embodiment, instead of using a single polynomial predictor (e.g., such as those depicted in equations (1) or (2)) for the whole range of possible SDR pixel values, one could divide the SDR pixel range (e.g., [0, K−1], where $K=2^{SDR\_BIT\_DEPTH}$) to two or more sub-ranges and then apply a predictor to each of the sub-ranges. In such an implementation, one needs to find the "pivot" or boundary points which separate the different piecewise polynomial predictors. For example, assuming piecewise polynomial prediction using two polynomials, in video prediction, one needs to identify pivot point $s_{jv}$ in the SDR domain which will partition the SDR range in to two ranges: [0, $s_{jv}$) and [$s_{jv}$, K−1). The piecewise polynomials may be linear or non-linear, all of the same order, or with different orders.

Consider, without loss of generality, a piecewise polynomial predictor using two second order polynomials (e.g., each polynomial is similar to the one in equation (2)), then, given a pivot point $s_{jv}$, there will be L pixels in the lower partition and H pixels in the upper partition, where P=L+H. Given an input pixel $s_{ji}$, the prediction process may be described as follows:

if $(0 \leq s_{ji} < s_{jv})$ $$\hat{v}_{ji} = m_{j0}^L + m_{j1}^L \cdot s_{ji} + m_{j2}^L \cdot (s_{ji})^2, \quad (8)$$

else $$\hat{v}_{ji} = m_{j0}^H + m_{j1}^H \cdot s_{ji} + m_{j2}^H \cdot (s_{ji})^2, \quad (9)$$

end
where $$m_j^L = \begin{bmatrix} m_{j0}^L \\ m_{j1}^L \\ m_{j2}^L \end{bmatrix} \text{ and } m_j^H = \begin{bmatrix} m_{j0}^H \\ m_{j1}^H \\ m_{j2}^H \end{bmatrix}$$

are the predictor coefficients used in the lower partition and the higher partition respectively.

Following, the same approach as before, given $$\hat{v}_j^L = S_j^L m_j^L,$$

and $$\hat{v}_j^H = S_j^H m_j^H, \quad (10)$$

the MSE solutions can be denoted as $$m_j^L = ((S_j^L)^T(S_j^L))^{-1}((S_j^L)^T v_j^L), \quad (11)$$

and $$m_j^H = ((S_j^H)^T(S_j^H))^{-1}((S_j^H)^T v_j^H), \quad (12)$$

where, given $$S_j^L = \begin{bmatrix} 1 & sl_{j0} & sl_{j0}^2 \\ 1 & sl_{j1} & sl_{j1}^2 \\ 1 & sl_{j2} & sl_{j2}^2 \\ \vdots & \vdots & \vdots \\ 1 & sl_{j,L-1} & sl_{j,L-1}^2 \end{bmatrix} \text{ and } v_j^L = \begin{bmatrix} vl_{j0} \\ vl_{j1} \\ vl_{j2} \\ \vdots \\ vl_{j,L-1} \end{bmatrix}, \quad (13)$$

$sl_{j,i}$ denotes SDR pixels where all $sl_{j,i} < s_{jv}$ and $vl_{j,i}$ denotes the corresponding EDR pixel values. Similarly, given $$S_j^H = \begin{bmatrix} 1 & sh_{j0} & sh_{j0}^2 \\ 1 & sh_{j1} & sh_{j1}^2 \\ 1 & sh_{j2} & sh_{j2}^2 \\ \vdots & \vdots & \vdots \\ 1 & sh_{j,H-1} & sh_{j,H-1}^2 \end{bmatrix} \text{ and } v_j^H = \begin{bmatrix} vh_{j0} \\ vh_{j1} \\ vh_{j2} \\ \vdots \\ vh_{j,H-1} \end{bmatrix}, \quad (14)$$

$sh_{j,i}$ denotes SDR pixels, where all $sh_{j,i} \geq s_{jv}$ and $vh_{j,i}$ denote the corresponding EDR pixel values. An output pivot point $s_i$, may be determined by computing the MSE for all possible pivot points and then selecting the pivot point with the smallest corresponding MSE.

In some embodiments, additional constraints may be applied to derive the piecewise polynomial predictors. For example, in an embodiment, given a continuity constraint at the pivot point ($s_{jv}$), the coefficients of the high-part prediction function may be expressed as $$m_{j0}^H = (m t_{j2}^H \cdot (s_{jv})^2 - m t_{j1}^H \cdot s_{jv} + \hat{v}_{jv})$$

$$m_{j1}^H = m t_{j1}^H - 2 m t_{j2}^H \cdot s_{jv}, \quad (15)$$

and $$m_{j2}^H = m t_{j2}^H,$$

where, given $$S_j^H = \begin{bmatrix} sh_{j0} - s_{jv} & (sh_{j0} - s_{jv})^2 \\ sh_{j1} - s_{jv} & (sh_{j1} - s_{jv})^2 \\ sh_{j2} - s_{jv} & (sh_{j2} - s_{jv})^2 \\ \vdots & \vdots \\ sh_{j,H-1} - s_{jv} & (sh_{j,H-1} - s_{jv})^2 \end{bmatrix} \text{ and } v_j^H = \begin{bmatrix} vh_{j0} - \hat{v}_{jv} \\ vh_{j1} - \hat{v}_{jv} \\ vh_{j2} - \hat{v}_{jv} \\ \vdots \\ vh_{j,P-1} - \hat{v}_{jv} \end{bmatrix}, \quad (16)$$

then $$\begin{bmatrix} m t_{j1}^H \\ m t_{j2}^H \end{bmatrix} = m t_j^H = \left( (S_j^H)^T (S_j^H) \right)^{-1} \left( (S_j^H)^T v_j^H \right). \quad (17)$$

Fast Algorithm

Solving for the piecewise polynomials and computing the associated MSE for each potential pivot point can be very computation intensive. A faster implementation is described next.

Consider a candidate pivot point $s_{jv}$. Given $$B_j^L = \begin{bmatrix} b_{j,00}^L & b_{j,01}^L & b_{j,02}^L \\ b_{j,10}^L & b_{j,11}^L & b_{j,12}^L \\ b_{j,20}^L & b_{j,21}^L & b_{j,22}^L \end{bmatrix} \quad (18)$$

$$= (S_j^L)^T (S_j^L)$$

$$= \begin{bmatrix} 1 & 1 & 1 & \cdots & 1 \\ s_{j0} & s_{j1} & s_{j2} & \cdots & s_{j,L-1} \\ s_{j0}^2 & s_{j1}^2 & s_{j2}^2 & \cdots & s_{j,L-1}^2 \end{bmatrix} \begin{bmatrix} 1 & s_{j0} & s_{j0}^2 \\ 1 & s_{j1} & s_{j1}^2 \\ 1 & s_{j2} & s_{j2}^2 \\ \vdots & \vdots & \vdots \\ 1 & s_{j,L-1} & s_{j,L-1}^2 \end{bmatrix},$$

each element can be expressed as $$b_{j,00}^L = L \quad (19)$$

$$b_{j,01}^L = b_{j,10}^L = \sum_{i=0}^{L-1} s_{ji}$$

$$b_{j,20}^L = b_{j,11}^L = b_{j,02}^L = \sum_{i=0}^{L-1} (s_{ji})^2$$

-continued $$b_{j,21}^L = b_{j,12}^L = \sum_{i=0}^{L-1} (s_{ji})^3$$

$$b_{j,22}^L = \sum_{i=0}^{L-1} (s_{ji})^4.$$

Similarly, given $$a_j^L = \begin{bmatrix} a_{j,0}^L \\ a_{j,1}^L \\ a_{j,2}^L \end{bmatrix} \quad (20)$$

$$= (S_j^L)^T v_j^L$$

$$= \begin{bmatrix} 1 & 1 & 1 & \cdots & 1 \\ s_{j0} & s_{j1} & s_{j2} & \cdots & s_{j,L-1} \\ s_{j0}^2 & s_{j1}^2 & s_{j2}^2 & \cdots & s_{j,L-1}^2 \end{bmatrix} \begin{bmatrix} v_{j0} \\ v_{j1} \\ v_{j2} \\ \vdots \\ v_{j,L-1} \end{bmatrix},$$

each element can be expressed as $$a_{j,0}^L = \sum_{i=0}^{L-1} v_{ji} \quad (21)$$

$$a_{j,1} = \sum_{i=0}^{L-1} (s_{ji} v_{ji})$$

$$a_{j,2} = \sum_{i=0}^{L-1} ((s_{ji})^2 v_{ji}).$$

For the higher partition, $$B_j^H = \begin{bmatrix} b_{j,00}^H & b_{j,01}^H & b_{j,02}^H \\ b_{j,10}^H & b_{j,11}^H & b_{j,12}^H \\ b_{j,20}^H & b_{j,21}^H & b_{j,22}^H \end{bmatrix} \quad (22)$$

$$= (S_j^H)^T (S_j^H),$$

$$a_j^H = \begin{bmatrix} a_{j,0}^H \\ a_{j,1}^H \\ a_{j,2}^H \end{bmatrix} \quad (23)$$

$$= (S_j^H)^T v_j^H,$$

and each element can be expressed as $$b_{j,mn}^H = b_{j,mn} - b_{j,mn}^L \text{ for } 0 \leq m \leq 2; 0 \leq n \leq 2,$$

$$a_{j,m}^H = a_{j,m} - a_{j,m}^L \text{ for } 0 \leq m \leq 2, \quad (24)$$

where the values of $b_{j,mn}$ and $a_{jm}$ (used to solve for the coefficients of a single polynomial predictor) can be computed using equations (19) and (21) for L=P.

From equations (18)-(22) one can make the following observations.

1. The values of $b_{j,mn}^L$ change when the pivot point moves. On the other hand, the SDR value $s_{ji}$ may have only up to K possible values.

a. Denote as $h_b$ the bin count for each SDR pixel value equal to b, where $b \in [0\ K-1]$); that is, the collection of $$h_b = \sum_{i=0}^{P-1} (s_{ji} == b), \text{ for } b = 0, 1, 2, \ldots, K-1, \quad (25)$$

represents a histogram of the pixel values in the j-th SDR frame.

b. The values of $s_{ji}$, $(s_{ji})^2$, $(s_{ji})^3$, and $(s_{j1})^4$ can be pre-computed and stored into one or more look-up tables (LUTs). These values need to be computed only once since for a fix bit-depth of the SDR input signal there are only K possible values. In an embodiment, those pre-calculated values can be obtained when the system initializes and thus enable fast pre-computation of $$t_b^n = \left(\frac{b}{2^{SDR\_bit\_depth}}\right)^n, \text{ for } n = 1, 2, 3, \text{ and } 4. \quad (26)$$

c. $b_{j,mn}^L$ values can be derived using the histogram (e.g., the $h_b$ values) and the pre-calculated $t_b$ values as:

$$b_{j,00}^L = \sum_{b=0}^{s_{jv}-1} h_b, \quad (27)$$

$$b_{j,01}^L = b_{j,10}^L = \sum_{b=0}^{s_{jv}-1} h_b t_b,$$

$$b_{j,20}^L = b_{j,11}^L = b_{j,02}^L = \sum_{b=0}^{s_{jv}-1} h_b t_b^2,$$

$$b_{j,21}^L = b_{j,12}^L = \sum_{b=0}^{s_{jv}-1} h_b t_b^3,$$

$$b_{j,22}^L = \sum_{b=0}^{s_{jv}-1} h_b t_b^4.$$

d. Let $$w_b = \sum_{i=0}^{P-1} ((s_{ji} == b) \cdot v_{ji}) \quad (28)$$

and $$w_b^2 = \sum_{i=0}^{P-1} ((s_{ji} == b) \cdot v_{ji}^2),$$

represent the sum and sum of squares (or 'energy') of those EDR pixel values in frame j corresponding to the SDR pixel values belonging to histogram bin b. These values can also be pre-computed in one or more LUTs, then e. $a_{j,m}^L$ can be expressed as $$a_{j,0}^L = \sum_{b=0}^{s_{jv}-1} w_b, \quad (29)$$

$$a_{j,1}^L = \sum_{b=0}^{s_{jv}-1} (w_b \cdot t_b),$$

$$a_{j,2}^L = \sum_{b=0}^{s_{jv}-1} (w_b \cdot t_b^2).$$

Hence, for each candidate pivot point, the values $b_{j,mn}^L$ and $a_{j,m}^L$ can be derived by few multiplications and additions of pre-computed data. Given the $b_{j,mn}^L$ and $a_{j,m}^L$, values, the $b_{j,mn}^H$ and $a_{j,m}^H$ values can be obtained directly from equation (24). Finally, the predictor coefficients can be derived as $$m_j^L = (B_j^L)^{-1} a_j^L,$$

$$m_j^H = (B_j^H)^{-1} a_j^H. \quad (30)$$

Note that in equation (24), the values of $b_{j,mn}$ and $a_{jm}$ (used to generate the coefficients of a single predictor) can be computed using equations (27) and (29) for L=P and $s_{jv}$=K.

Given the two polynomials, one still needs to compute the corresponding total distortion metric (e.g., the MSE). An iterative computational approach can also reduce the amount of these computations. For example, denote the lower-partition MSE as $$D_j^L(s_{jv}) = \sum_{i=0}^{L-1} (v_{ji} - \hat{v}_{ji})^2 \quad (31)$$

$$= \sum_{i=0}^{L-1} ((v_{ji})^2 - 2v_{ji}\hat{v}_{ji} + (\hat{v}_{ji})^2)$$

$$= \left(\sum_{i=0}^{L-1} (v_{ji})^2\right) - 2\left(\sum_{i=0}^{L-1} v_{ji}\hat{v}_{ji}\right) + \left(\sum_{i=0}^{L-1} (\hat{v}_{ji})^2\right).$$

Each term can be simplified and be computed in terms of the pre-computed LUTs so that $$D_j^L(s_{jv}) = \sum_{b=0}^{s_{jv}-1} (w_b^2 - 2w_b \cdot \hat{v}_{jb} + h_b \cdot (\hat{v}_{jb})^2). \quad (32)$$

Similarly, for the higher partition, it can be shown that $$D_j^H(s_{jv}) = \sum_{i=L}^{P-1} (v_{ji} - \hat{v}_{ji})^2 \quad (33)$$

$$= \sum_{b=s_{jv}}^{K-1} (w_b^2 - 2w_b \cdot \hat{v}_{jb} + h_b \cdot (\hat{v}_{jb})^2).$$

Assuming, as an example, a total distortion metric defined as $$D_j(s_{jv}) = D_j^H(s_{jv}) + D_j^L(s_{jv}),$$

then the output (or optimal under some cost criterion) pivot point is selected when $D_j$ is the minimal, i.e.:

$$s_{jv}^{opt} = \underset{s_{jv}}{\arg\min} D_j(s_{jv}). \quad (34)$$

Figure 2:
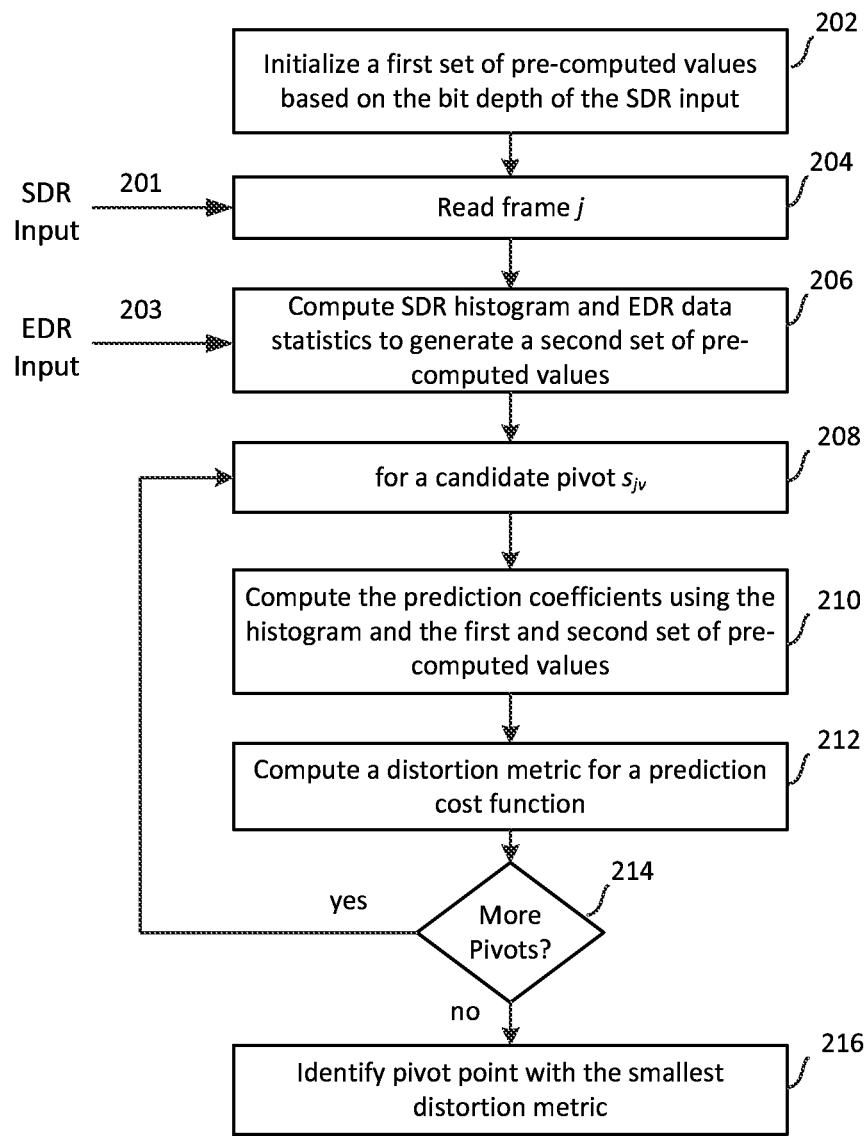
FIG. 2 and FIG. 3 depict example processes for generating a piecewise inter-layer predictor according to embodiments of this invention.

The above computation steps are summarized in FIG. 2.

FIG. 2 depicts an example process for the fast derivation of the polynomial segments and the optimal pivot points in a piecewise inter-layer predictor, according to an embodiment. In step (202), one or more look-up tables (LUTs) are generated storing a first set of pre-computed values (e.g., the $t_b^n$ values in equation (26)). For a given, fixed, SDR bit depth, these tables are applicable to any frame of the SDR input video sequence. Steps (206)-(216) may be repeated for input EDR and SDR data (e.g., (201) and (203)) whenever a piecewise predictor needs to be generated. In step (206), for a given frame j, a histogram $h_b$ of the SDR values, and corresponding EDR data statistics, (e.g., the $w_b$ and $w_b^2$ values in equations (25) and (28)), may be computed to generate a second set of pre-computed values. Next, in step (208), a candidate pivot point $s_{jv}$ within a given range of possible pivot points is selected.

In an embodiment, $s_{jv}$ may be selected to be within the range of [0, K−1]; however, computation may be further simplified by using alternative boundary points. For example, pixel values in frame j may be bounded by minimum and maximum pixel values, e.g., $\text{Min}_{SDR(j)}$ and $\text{Max}_{SDR(j)}$. Then, the search for a pivot point may be constrained within the [$\text{Min}_{SDR(j)}$, $\text{Max}_{SDR(j)}$] range.

Furthermore, within a consecutive sequence of video frames (e.g., within a scene or a 'cut'), the optimal pivot point for frame j is very likely within a certain bound of the optimal pivot point for a prior frame (e.g., $s_{j-1,v}^{opt}$). Hence, the search of the optimal pivot point may be restricted within a range [search_low, search_high], where for a given threshold delta, search_low=max($s_{j-1,v}^{opt}$−delta,0), and search_high=min($s_{j-1,v}^{opt}$+delta,K−1).

Given the candidate pivot point $s_{jv}$, after computing $B_j^L$, $B_j^H$, $a_j^L$, and $a_j^H$ by taking advantage of the pre-computed values and LUTs, then one can generate the predictor coefficients $m_j^L$ and $m_j^H$ as discussed earlier (see equations (27)-(30)) and the corresponding prediction values $\hat{v}_j$ (e.g., see equation (10)).

In step (212), for each candidate pivot point, a distortion metric (e.g., the MSE in equations (32)-(33)) is computed. Steps (210) and (212) are repeated for all candidate pivot points under consideration. When all candidate pivot points have been computed, in step (216), an output pivot point is generated, typically the one for which the measured distortion is the smallest.

Piecewise Polynomials with Continuity Constraint

The previous discussion can be extended to the case where one imposes a continuity constraint between the lower and upper polynomials at the pivot point. The calculations for the lower partition remain the same. For the upper partition, in an embodiment, the following equations may apply. Let $\overline{H}$ denote the case where the upper polynomial satisfies a continuity constraint, then for $B_j^{\overline{H}}$, each element can be expressed as $$b_{j,11}^{\overline{H}} = \sum_{b=s_{jv}}^{K-1} h_b t_{(b-s_{jv})}^2, \quad (35)$$

$$b_{j,21}^{\overline{H}} = b_{j,12}^{\overline{H}} = \sum_{b=s_{jv}}^{K-1} h_b t_{(b-s_{jv})}^3,$$

$$b_{j,22}^{\overline{H}} = \sum_{b=s_{jv}}^{K-1} h_b t_{(b-s_{jv})}^4.$$

Note that the same $t_b^n$ values computed earlier apply as well; however, they are used with a shifted index.

Similarly, the elements of $a_j^{\overline{H}}$ can be expressed as $$\begin{aligned} a_{j,1}^{\overline{H}} &= \sum_{i=L}^{P-1} (s_{j,i} - s_{jv})(v_{j,k} - \hat{v}_{jv}) \\ &= \sum_{b=s_{jv}}^{K-1} \sum_{i=L}^{P-1} (s_{j,i} == b)(s_{j,i} - s_{jv})(v_{j,i} - \hat{v}_{jv}) \\ &= \sum_{b=s_{jv}}^{K-1} \left(t_{(b-s_{jv})} \cdot (w_b - \hat{v}_{jv} h_b)\right). \end{aligned} \quad (36)$$

$$\begin{aligned} a_{j,2}^{\overline{H}} &= \sum_{i=L}^{P-1} (s_{j,i} - s_{jv})^2 (v_{j,i} - \hat{v}_{jv}) \\ &= \sum_{b=s_{jv}}^{K-1} \sum_{i=L}^{P-1} (s_{j,i} == b)(s_{j,i} - s_{jv})^2 (v_{j,i} - \hat{v}_{jv}) \\ &= \sum_{b=s_{jv}}^{K-1} \left(t_{(b-s_{jv})}^2 \cdot (w_b - \hat{v}_{jv} h_b)\right). \end{aligned}$$

Given $mt_j^{\overline{H}} = (B_j^{\overline{H}})^{-1} a_j^{\overline{H}}$, the actual predictor coefficients may be computed as in equation (15).

Practitioners skilled in the art will appreciate that there are many other ways to enforce continuity constrains. For example, in an embodiment, one may determine first the polynomial in the high partition and then determine the polynomial of the lower partition using a continuity constraint.

The above techniques may be combined with other techniques to reduce the computational complexity of the operations. For example, histogram $h_b$ of the SDR values and the corresponding EDR data statistics, $w_b$ and $w_b^2$, may be computed using only part of the total pixel values in a frame. For example, in an embodiment, these value may be computed using only every p-th pixel (e.g., p=2).

Predictor Temporal Stability

In practice, given an EDR source (102), the SDR images (e.g., 104) are generated scene by scene either by a colorist or color mapping software or a combination of both. An ideal predictor could be scene-based; however, such a process requires looking at all the frames in a scene and thus may require extensive memory storage requirements. When the predictor is frame based, sudden variations of the predictor may result in residuals (167) that are difficult to encode efficiently, especially at low bit rates. Then, it may be preferred to control the amount of variation. Using pseudo-code, this may be expressed as follows:

```
If (reset) { //For example, in a new scene
compute new h_b, w_b and w_b^2;
}
else
{keep h_b, w_b, and w_b^2 from the previous frame }
```

In another embodiment, histogram and EDR statistical data may be stored for each frame for the last F frames, and the predictors may utilize a function of these data. For example, using pseudo-code, this may be expressed as follows:

$$\text{for frame } j \text{ compute } h_{jb}, w_{jb}, \text{ and } w_{jb}^2$$
$$\text{then}$$
$$h_b = \sum_{n=0}^{F} c_{1n} h_{j-n,b},$$
$$w_b = \sum_{n=0}^{F} c_{2n} w_{j-n,b}, \quad (37)$$
$$w_b^2 = \sum_{n=0}^{F} c_{3n} w_{j-n,b}^2,$$

where $c_{1n}$, $c_{2n}$, $c_{3n}$ for $n=0$ to $F$, are predetermined weights. Practitioners in the field of image and video processing will appreciate that the linear weighting function in equation (37) may be substituted by other linear or non-linear functions.

The techniques discussed earlier for a two-piece polynomial can easily be extended to predictors with more than two polynomials. For example, consider the case of a three-piece piecewise predictor with two pivot points, $s_{jv1}$ and $s_{jv2}$. The construction of the lower polynomial is the same as the construction of the lower polynomial in the two-pieces polynomial with $s_{jv1}=s_{jv}$. The construction of the high polynomial is the same as the construction of the high polynomial in the two-pieces polynomial, but starting at $s_{jv2}$, and the construction of the middle polynomial is the same as the construction of the high polynomial in the two-pieces polynomial, but with an ending boundary of $s_{jv2}$.

Search algorithms may look into all possible valid combinations of $s_{jv1}$ and $s_{jv2}$ or use other heuristics and prior decisions to reduce the search time. For example, in an embodiment, a histogram of the SDR pixels may be used to help divide pixels into "blacks", "mid-tones," and "highlights" and then use these ranges to restrict the search range of the boundaries for the piecewise polynomials.

Alternative Cost Criteria

As depicted in FIG. 1, the prediction error (167) is encoded in the enhancement layer by EL encoder (160). In coding, the dynamic range of the prediction error is important since a smaller range will require smaller quantization steps, hence yielding smaller quantization distortion. In an embodiment, the problem of finding the pivot point ($s_{jv}$) may be formulated to minimize the difference between the maximum positive and the minimum negative prediction errors.

Let the predicted value based on this pivot point ($s_{jv}$) be denoted as $\hat{v}_{ji}(s_{jv})$.

Then a solution can be obtained as follows: For each candidate pivot, consider again a solution using two polynomials, one for the lower partition and one for the higher partition. In an embodiment, let the cost function be denoted as $$R_j(s_{jv}) = \min\left(\max_{i, e_{ji}>0} \{e_{ji}(s_{jv})\} - \min_{i, e_{ji}<0} \{e_{ji}(s_{jv})\}\right), \quad (38)$$

where $e_{ji}(s_{jv})=v_{ji}(s_{jv})-\hat{v}_{ji}(s_{jv})$ denotes the estimation error (e.g., 167) for a candidate pivot point. Then, an optimal pivot point may be the one that yields the smallest $R_j(s_{jv})$ among all candidate pivot points, $$s_{jv}^{opt} = \underset{s_{jv}}{\arg\min} R_j(s_{jv}).$$

Practitioners skilled in the art will appreciate that the methods discussed herein may apply to a variety of other predictors without limitation on either the dynamic range or bit-depth of the input or output (predicted) signals. For example, in some embodiments similar approaches may be used to design an SDR to SDR signal predictor, and EDR to SDR signal predictor, or an EDR to an EDR signal predictor.

Fast Multi-Segment Predictor

Searching for the optimal pivot points using a full search may be very time consuming. In some embodiments, it may be preferential to increase the number of segments but use sub-optimally defined pivot points. In an embodiment, a multi-segment predictor (e.g., using eight segments) uses first or second order polynomials defined using mostly equidistant pivot points. As before, computing the prediction polynomials takes advantage of pre-computed LUTs. In addition, the polynomials are computed using available pixels from overlapping training segments.

Let $s_i$ be the i-th pixel value in a color plane in the SDR data, and let $v_j$ be the j-th pixel value in the same color plane in the original EDR data. Let the bit depth in the base layer (BL) be denoted as SDR_BIT_DEPTH, then the number of possible pixel values in a color plane in the BL is $K=2^{SDR\_BIT\_DEPTH}$. In an embodiment, a fast multi-piece predictor may be constructed in two stages: a) A set of pivot points is determined. b) Given the generated pivot points, a set of 2-d order or 1-st order polynomials is determined.

A. Pivot Point Selection

Consider M segments determined by M+1 pivot points (e.g., M=8). Denote those pivot points as $s_{j,v(0)}$, $s_{j,v(1)}$, $s_{j,v(2)}$, . . . , and $s_{j,v(M)}$. Without limitation, let $s_{j,v(0)}=0$; and $s_{j,v(M)}=K-1$ for un-normalized BL data. Note that, without limitation, each segment partition may be considered left closed and right open, namely, $[s_{j,v(g-1)}, s_{j,v(g)})$. In an embodiment, to expedite processing computations, for all pivot points between the second pivot point and the second to last pivot point, the distance between two pivot points is defined to be the same; however, a person with ordinary skill in the art would appreciate that alternative non-uniform segmentation schemes may also be applied.

In an embodiment, pivot points may be determined as follows:

a) Compute:

$$s_{j,min} = \min\{s_{j,i}\} \text{ // The minimum } SDR \text{ value in a region} \quad (39)$$
$$j \text{ of pixels of interest (e.g., a region of a frame,}$$
$$\text{a whole frame, or a sequence of frames)}$$

-continued $s_{j,max} = \max\{s_{j,i}\}$ // The maximum SDR value in the region of pixels of interest.

Let $I = \dfrac{s_{j,max} - s_{j,min}}{M - 1}$ b) Then, construct the pivot point list as follows:

$s_{j,v(0)}=0$, $s_{j,v(1)}=\text{floor}(s_{j,min}+0.5 \cdot I)$ $s_{j,v(g)}=\text{floor}(s_{j,min}+(g-0.5) \cdot I)$,

...

$s_{j,v(M-1)}=\text{floor}(s_{j,min}+(M-1.5) \cdot I)$ $s_{j,v(M)}=K-1$. (40)

In a typical predictor, given a segment $[s_{j,v(g)}, s_{j,v(g+1)})$, the prediction coefficients will be determined using available pixel values from that segment only; however, in an embodiment, predictor coefficients may be determined by using pixel values of neighboring segments as well, for example, within the range $[s_{j,v(g)}-\Delta_L, s_{j,v(g+1)}+\Delta_h)$, where $\Delta_L$ and $\Delta_h$ are overlapping factors. This allows for smoother transitions between two neighbor prediction polynomials.

B. Determining the Piecewise Polynomials

Figure 3:
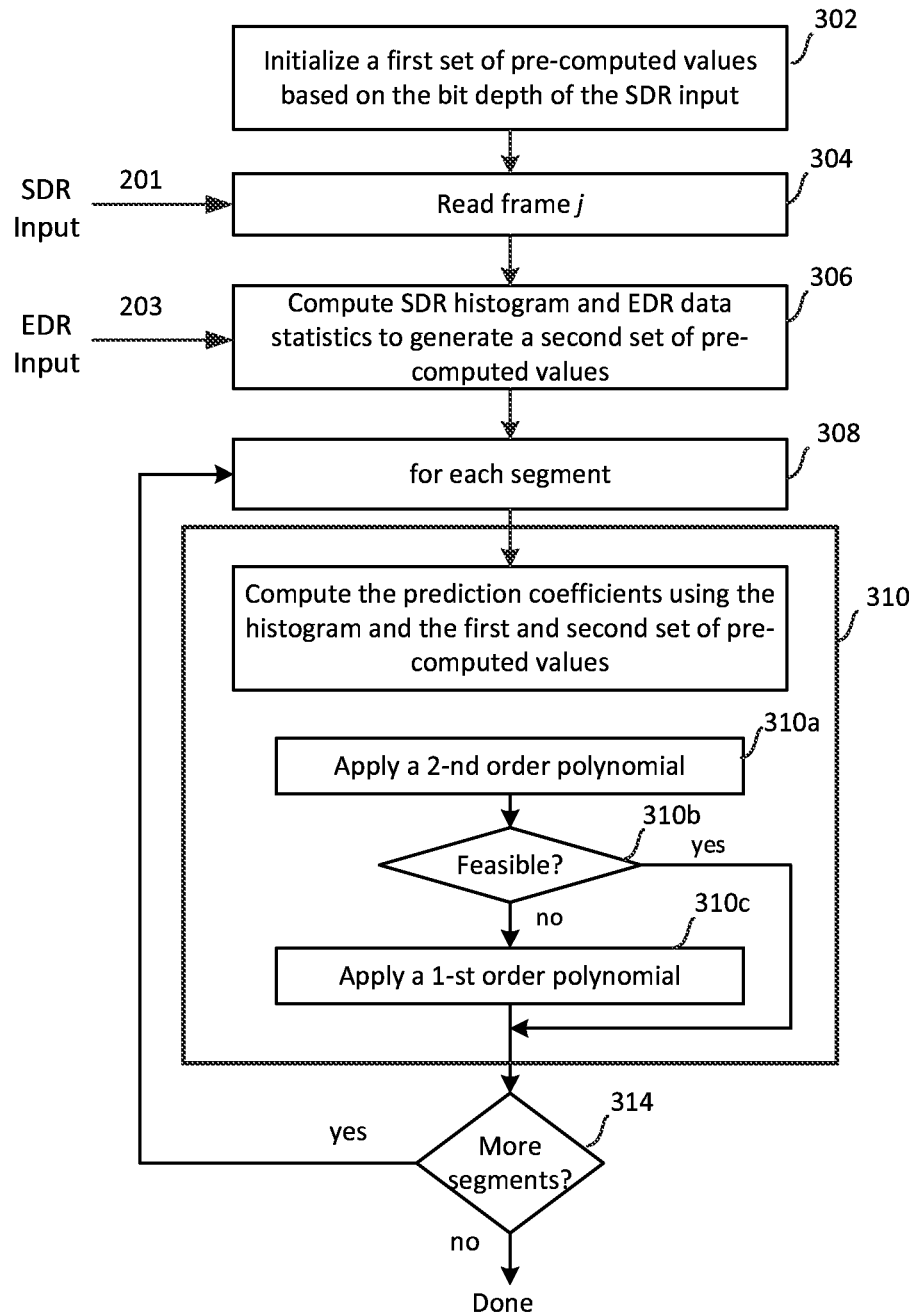

Following the same discussion as before, FIG. 3 depicts an example process for determining the piecewise polynomials according to an example embodiment.

In step (302), a first set of pre-computed values are initialized based on the bit depth of the SDR input. As in step (202), one or more LUTs are generated storing a first set of pre-computed values (e.g., the $t_b^n$ values in equation (26)). For a given, fixed, SDR bit depth, these tables are applicable to any frame of the SDR input video sequence (201).

In step (306), for a given frame j, a histogram $h_b$ of the SDR values, and corresponding EDR data statistics, (e.g., the $w_b$ and $w_b^2$ values in equations (25) and (28)), may be computed to generate a second set of pre-computed values.

Step (310) is computed for each segment defined using the pivot point list computed using equations (39) and (40). Step (310) may be divided into two separate sub-processes: a) for the first segment and b) each subsequent segment.

First Segment Process

For the first segment, the predictor coefficients are derived from pixels Of a training segment with the extended range $[0, s_{j,v(1)}-1+\Delta]$, which alternatively may be defined using two variables:

$\alpha=0$, and $\beta=\min\{_{j,v(1)}-1+\Delta, K-1\}$, to prevent using pixels outside of the valid data range.

Let $B_j^1 = \begin{bmatrix} b_{j,00}^1 & b_{j,01}^1 & b_{j,02}^1 \\ b_{j,10}^1 & b_{j,11}^1 & b_{j,12}^1 \\ b_{j,20}^1 & b_{j,21}^1 & b_{j,22}^1 \end{bmatrix}$ and $a_j^1 = \begin{bmatrix} a_{j,0}^1 \\ a_{j,1}^1 \\ a_{j,2}^1 \end{bmatrix}$, (41)

where $$b_{j,00}^1 = \sum_{b=\alpha}^{\beta} h_b \quad (42)$$

$$b_{j,01}^1 = b_{j,10}^1 = \sum_{b=\alpha}^{\beta} h_b t_b$$

$$b_{j,20}^1 = b_{j,11}^1 = b_{j,02}^1 = \sum_{b=\alpha}^{\beta} h_b t_b^2,$$

$$b_{j,21}^1 = b_{j,12}^1 = \sum_{b=\alpha}^{\beta} h_b t_b^3 \quad (43)$$

$$b_{j,22}^1 = \sum_{b=\alpha}^{\beta} h_b t_b^4$$

and $$a_{j,0}^1 = \sum_{b=\alpha}^{\beta} w_b$$

$$a_{j,1}^1 = \sum_{b=\alpha}^{\beta} (w_b \cdot t_b),$$

$$a_{j,2}^1 = \sum_{b=\alpha}^{\beta} (w_b \cdot t_b^2).$$

Then, under an MSE criterion, the predictor coefficients for a second order polynomial (see equation (2)) can be obtained by $m_j^1 = (B_j^1)^{-1} a_j^1$. (44)

Subsequent Segments Process

In an embodiment, for the g-th segment, where g>1, it may be desired to maintain a continuity constraint at the segment boundaries. Hence, at the boundary point between segments g−1 and g, the predicted value $\hat{v}_{j,v(g-1)}$ may be determined as $v_{j,v(g-1)} = m_{j0}^{g-1} + m_{j1}^{g-1} \cdot s_{j,v(g-1)} + m_{j2}^{g-1} \cdot (s_{j,v(g-1)})^2$.

Let again the boundary points α and β for pixels under consideration in a training segment be defined as:

$\alpha = s_{j,v(g-1)}$, and, if the current segment is the last segment, then $\beta = \min\{s_{j,v(g)}-1+\Delta, K-1\}$ else $\beta = s_{j,v(g)}-1+\Delta$.

Let $B_j^g = \begin{bmatrix} b_{j,11}^g & b_{j,12}^g \\ b_{j,21}^g & b_{j,22}^g \end{bmatrix}$ and $a_j^g = \begin{bmatrix} a_{j,1}^g \\ a_{j,2}^g \end{bmatrix}$, (45)

where $$b_{j,11}^g = \sum_{b=\alpha}^{\beta} h_b t_{(b-s_{j,v(g-1)})}^2 \quad (46)$$

$$b_{j,21}^g = b_{j,12}^g = \sum_{b=\alpha}^{\beta} h_b t_{(b-s_{j,v(g-1)})}^3,$$

-continued $$b_{j,22}^g = \sum_{b=\alpha}^{\beta} h_b t_{(b-s_{j,v(g-1)})}^4 \qquad (47)$$

and $$a_{j,1}^g = \sum_{b=\alpha}^{\beta} \left( t_{(b-s_{j,v(g-1)})} \cdot (w_b - \hat{v}_{j,v(g-1)} h_b) \right)$$

$$a_{j,2}^g = \sum_{b=\alpha}^{\beta} \left( t_{(b-s_{j,v(g-1)})}^2 \cdot (w_b - \hat{v}_{j,v(g-1)} h_b) \right).$$

Then, preliminary predictor coefficients can be obtained as $$\begin{bmatrix} mt_{j1}^g \\ mt_{j2}^g \end{bmatrix} = mt_j^g = (B_j^g)^{-1}(a_j^g). \qquad (48)$$

The actual predictor coefficients need to be converted back using the equations mentioned in the previous sections:

$$m_{j0}^g = (mt_{j2}^g \cdot (s_{j,v(g-1)})^2 - mt_{j1}^g \cdot s_{j,v(g-1)} + \hat{v}_{j,v(g-1)}),$$

$$m_{j1}^g = mt_{j1}^g - 2mt_{j2}^g \cdot s_{j,v(g-1)},$$

$$m_{j2}^g = mt_{j2}^g. \qquad (49)$$

As noted in step (310b) of FIG. 3, in some embodiments, due to numerical issues, for example, the polynomial coefficients may have values outside of a supported numerical range, the solutions may be considered "Non feasible"; then, for that segment, one may apply a first order polynomial. For example, for the first segment, if the coefficients violate a feasibility limitation, then the coefficients of a first order polynomial may be determined using $$m_j^1 = (B_j^1)^{-1} a_j^1, \qquad (50)$$

where $$B_j^1 = \begin{bmatrix} b_{j,00}^1 & b_{j,01}^1 \\ b_{j,10}^1 & b_{j,11}^1 \end{bmatrix} \text{ and } a_j^1 = \begin{bmatrix} a_{j,0}^1 \\ a_{j,1}^1 \end{bmatrix}, \qquad (51)$$

where all matrix and vector elements are defined as in equations (42) and (43). Similarly, for the g-th segment (g>1), the coefficients of a first order polynomial may be derived as $$m_{j0}^g = \hat{v}_{j,v(g-1)} - mt_{j1}^g \cdot s_{j,v(g-1)},$$

$$m_{j1}^g = mt_{j1}^g \qquad (52)$$

where, given $a_{j,1}^g$ and $b_{j,11}^g$, as defined by equations (46) and (47), $$mt_{j1}^g = \frac{a_{j,1}^g}{b_{j,11}^g}. \qquad (53)$$

Selection of Δ

In an embodiment, Δ may be fixed as a small percentage of the segment length (e.g., 10%). In another embodiment, Δ may be determined iteratively so that the prediction curve satisfies a certain criterion, e.g., being non-decreasing across the full range of SDR values. For example, as SDR values increase, if the SDR to EDR mapping is decreasing at some segment interval, then for that interval, the value of Δ may be incrementally increased until the SDR to EDR mapping is never decreasing across the full range of SDR values.

Segment Merging

In an embodiment, under certain conditions, two neighbor segments may be merged into a single segment. For example, if the number of available pixels in a segment is less than a threshold, then that segment may be merged with the next segment. If the threshold is still not satisfied, then this procedure may continue until the number of pixels in the merged segments is more than the threshold. For the last segment, if it has fewer pixels than the threshold, then it may be merged with the second to last segment.

Segments with Skewed Pixel Distributions

Depending on the content, it has been observed that certain segments may have skewed pixel distributions. For example, in certain segments of the SDR range, most observable pixels may be skewed towards an end-boundary of the segments. In an embodiment, for such segments with highly skewed pixel distributions, the predictor coefficients may be generated using an "equal-weight" cost function rather than the histogram-based weight.

Consider again segment g, for g>1. Given $B_j^g$ and $a_j^g$ as noted in equation (45), let their elements be now defined as $$b_{j,11}^g = \sum_{b=\alpha}^{\beta} t_{(b-s_{j,v(g-1)})}^2 \qquad (54)$$

$$b_{j,21}^g = b_{j,12}^g = \sum_{b=\alpha}^{\beta} t_{(b-s_{j,v(g-1)})}^3,$$

$$b_{j,22}^g = \sum_{b=\alpha}^{\beta} t_{(b-s_{j,v(g-1)})}^4 \qquad (55)$$

and $$a_{j,1}^g = \sum_{b=\alpha}^{\beta} \left( t_{(b-s_{j,v(g-1)})} \cdot \left( \frac{w_b}{h_b} w_b - \hat{v}_{j,v(g-1)} \right) \right)$$

$$a_{j,2}^g = \sum_{b=\alpha}^{\beta} \left( t_{(b-s_{j,v(g-1)})}^2 \cdot \left( \frac{w_b}{h_b} - \hat{v}_{j,v(g-1)} \right) \right).$$

Compared to equation (46), in equation (54), for the $B_j^g$ elements, there is no more weighting with the histogram coefficients $h_b$; hence all $t_b''$ values are equally weighted. Similarly, compared to equation (47), in equation (55), for the $a_j^g$ elements, the $t_b''$ values are normalized by $h_b$, which yields $w_b$ values now normalized by $h_b$ values. To avoid division by zero, for $h_b=0$, zero histogram values may be interpolated from neighbor non-zero pixel counts. Given equations (54) and (55), the predictor coefficients are generated as before using equations (48) and (49).

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control or execute instructions relating to piece-wise inter-layer prediction, such as those described herein. The computer and/or IC may compute any of a variety of parameters or values that relate to piece-wise inter-layer prediction as described herein. The encoding and decoding embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to piece-wise inter-layer prediction as described above by executing software instructions in a program memory accessible to the processors. The invention may also be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

EQUIVALENTS, EXTENSIONS, ALTERNATIVES AND MISCELLANEOUS

Example embodiments that relate to piecewise inter-layer prediction are thus described. In the foregoing specification, embodiments of the present invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

The invention claimed is:

1. A method for generating a piecewise inter-layer predictor, the method comprising:
accessing a first video signal with a first dynamic range;
accessing a second video signal representing the first video signal in a second dynamic range, wherein the second dynamic range is lower than the first dynamic range; and
generating with a processor a piecewise inter-layer predictor to predict pixels of the first video signal based on pixels of the second video signal, wherein generating the piecewise inter-layer predictor comprises:
generating a first set of pre-computed values based on computing $b^n$, wherein b denotes a pixel value in a frame of the second video signal in the range $[0, K-1]$, n is an integer larger than 0, $K=2^M$, and M denotes the bit depth of the second video signal;
for a frame of the second video signal, using the processor to:
generate a histogram for the frame of the second video signal, wherein generating a histogram value $h_b$ comprises computing $$h_b = \sum_{i=0}^{P-1} (s_{ji} == b),$$

wherein for the j-th frame in the second video signal, P denotes the total number of pixels under consideration in the frame, and $s_{ji}$ denotes pixel values of the second video signal in the frame;
generate a second set of pre-computed values comprising:

$$w_b = \sum_{i=0}^{P-1} ((s_{ji} == b) \cdot v_{ji})$$

and $$w_b^2 = \sum_{i=0}^{P-1} ((s_{ji} == b) \cdot v_{ji}^2),$$

wherein $v_{ji}$ denotes pixel values of the corresponding j-th frame in the first video signal; and
generating coefficients of at least one polynomial in the piecewise predictor using the first set and second set of pre-computed values and the histogram.

2. The method of claim 1, wherein the first dynamic range is a high or an enhanced dynamic range, and the second dynamic range is a standard dynamic range.

3. The method of claim 2, wherein the bit depth M is 8 or 10 bits.

4. The method of claim 1, wherein generating the first set of pre-computed values comprises computing $$t_b^n = \left(\frac{b}{K}\right)^n$$

5. The method of claim 1, wherein generating the piecewise predictor further comprises computing an output pivot point of the predictor, wherein the pivot point separates the input range between a first and a second polynomial of the predictor, wherein computing the output pivot point comprises:
for two or more candidate pivot points within a range of possible pivot points:
compute the coefficients of the first and second polynomials using the first set and the second set of pre-computed values;
compute a distortion metric for a prediction cost function based on the computed coefficients; and
select as the output pivot point, the pivot point among the two or more candidate pivot points for which the computed distortion metric is minimum.

6. The method of claim 5, wherein the computed distortion metric is based on the mean square error difference between predicted values generated using the predictor polynomials and corresponding pixel values of the first video signal.

7. The method of claim 5, wherein the computed distortion metric is based on minimizing the difference between a maximum positive and a minimum negative prediction error generated using the polynomial predictor.

8. The method of claim 1, wherein the piecewise predictor comprises two, four, six, or eight, second-order polynomials.

9. The method of claim 5, wherein computing the coefficients of the first and second polynomials using the first and the second set of pre-computed values takes into consideration a continuity constrain between the first and second polynomials at the candidate pivot point.

10. The method of claim 5, wherein computing the distortion metric is based on the computed histogram and the second set of pre-computed values.

11. The method of claim 5, wherein computing the distortion metric comprises computing $$D_j^L(s_{jv}) = \sum_{b=0}^{s_{jv}-1} \left( w_b^2 - 2w_b \cdot \hat{v}_{jb} + h_b \cdot (\hat{v}_{jb})^2 \right)$$

wherein $s_{jv}$, denotes the candidate pivot point, $w_b$ denotes a value in the second set of pre-computed values, $h_b$ denotes a histogram value for a pixel with value b, and $\hat{v}_{jb}$ denotes predicted values.

12. The method of claim 5, wherein the range of possible pivot points comprises the range [0, K−1].

13. The method of claim 5, wherein the range of possible pivot points comprises the range [search_low, search_high], where for a given threshold delta, search_low=max($s_{j-1,v}^{opt}$−delta, 0), search_high=min($s_{j-1,v}^{opt}$+delta, K−1), where $s_{j-1,v}^{opt}$ denotes the output pivot point for a previous frame.

14. The method of claim 1, wherein generating the histogram and values in the second set of pre-computed values for a current frame takes into consideration histogram values and pre-computed values for one or more previous frames to the current frame.

15. The method of claim 4, wherein P, the total number of pixels under consideration in frame j, is smaller than the actual number of pixels in the frame j.

16. The method of claim 1, wherein the first set and the second set of pre-computed values are stored into one or more look-up tables.

17. The method of claim 1, wherein generating the piecewise predictor further comprises:
dividing the second dynamic range into a set of segments, wherein the lengths of each segment between the second segment and the second to last segment are equal.

18. The method of claim 17, further comprising:
for at least one segment in the set of segments,
determining a training segment, wherein the training segment comprises the at least one segment and part of its neighbor segment; and generating coefficients of the polynomial predictor for the at least one segment using pixels in the training segment.

19. An apparatus comprising a processor and configured to perform the method recited in claim 1.

20. A non-transitory computer-readable storage medium having stored thereon computer-executable instructions for executing a method with one or more processors in accordance with claim 1.

* * * * *